Figure 2:
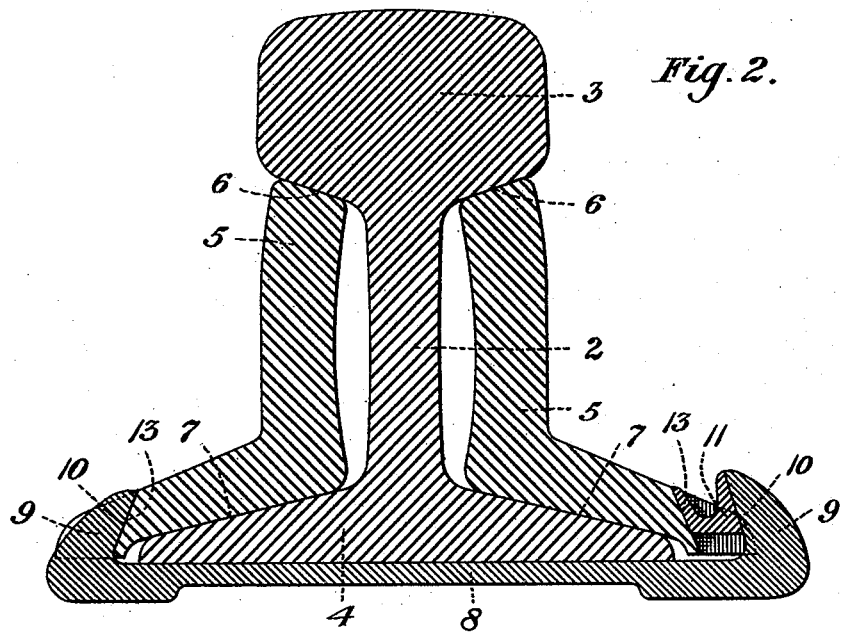

(No Model.)  6 Sheets—Sheet 1.
J. L. POPE.
AUTOMATIC LOCK JOINT FOR RAILWAY RAILS.
No. 492,558. Patented Feb. 28, 1893.
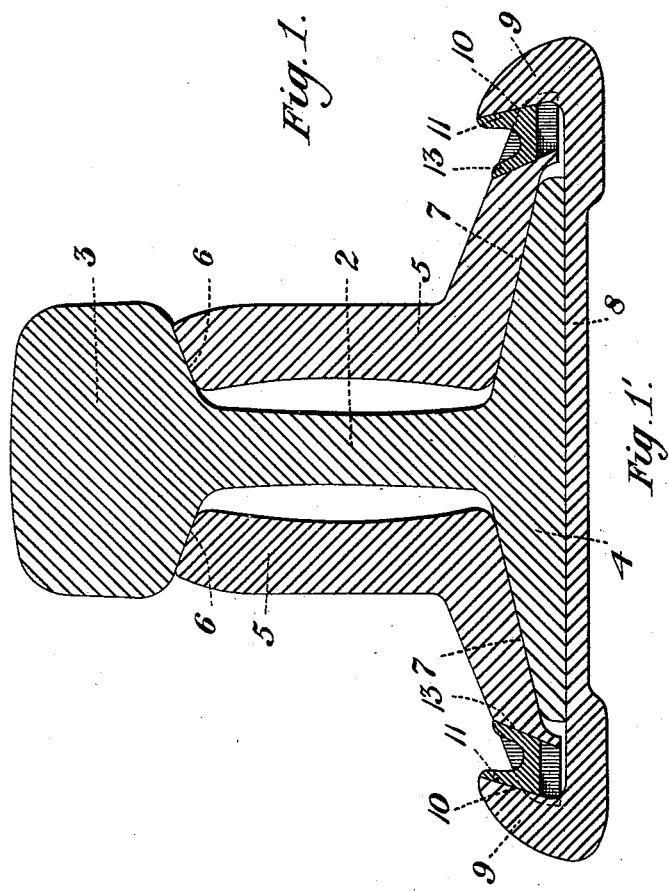
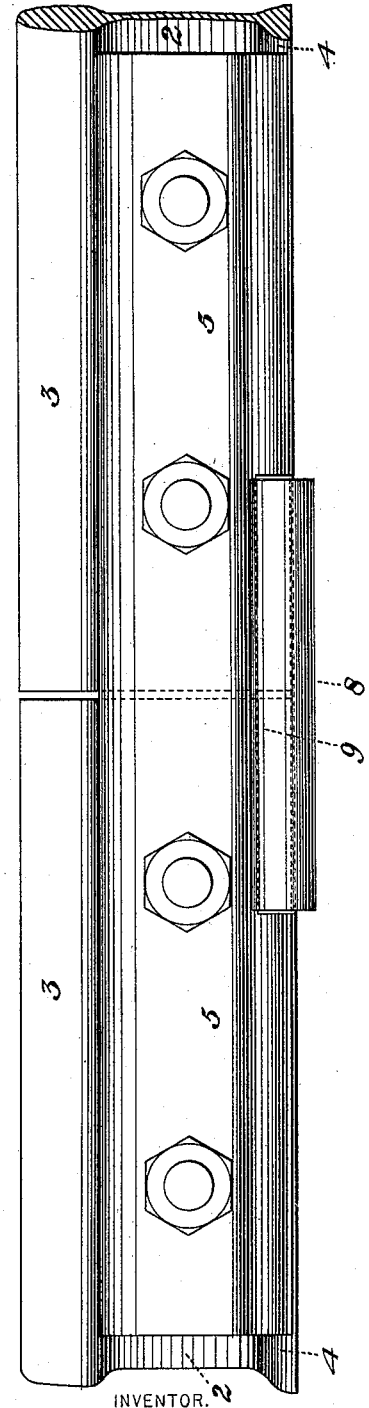
WITNESSES
INVENTOR (No Model.) 6 Sheets—Sheet 2.

J. L. POPE.
AUTOMATIC LOCK JOINT FOR RAILWAY RAILS.

No. 492,558. Patented Feb. 28, 1893.

WITNESSES.

INVENTOR
John Long Pope (No Model.) 6 Sheets—Sheet 3.
J. L. POPE.
AUTOMATIC LOCK JOINT FOR RAILWAY RAILS.
No. 492,558. Patented Feb. 28, 1893.

WITNESSES.
Fred. C. Smith
Henry T. Pope

INVENTOR.
John L. Pope (No Model.) 6 Sheets—Sheet 4.
J. L. POPE.
AUTOMATIC LOCK JOINT FOR RAILWAY RAILS.
No. 492,558. Patented Feb. 28, 1893.

WITNESSES.
Fred C. Smith
Henry F. Pope

INVENTOR
John Lang Pope (No Model.) 6 Sheets—Sheet 5.
J. L. POPE.
AUTOMATIC LOCK JOINT FOR RAILWAY RAILS.
No. 492,558. Patented Feb. 28, 1893.

WITNESSES.
Fred C. Smith
Henry F. Pope

INVENTOR.
John L. Pope (No Model.) 6 Sheets—Sheet 6.

J. L. POPE.
AUTOMATIC LOCK JOINT FOR RAILWAY RAILS.

No. 492,558. Patented Feb. 28, 1893.

WITNESSES
INVENTOR

UNITED STATES PATENT OFFICE.

JOHN LANG POPE, OF CLEVELAND, OHIO.

AUTOMATIC LOCK-JOINT FOR RAILWAY-RAILS.

SPECIFICATION forming part of Letters Patent No. 492,558, dated February 28, 1893.

Application filed December 31, 1891. Serial No. 416,726. (No model.)

*To all whom it may concern:*

Be it known that I, JOHN LANG POPE, of Cleveland, in the county of Cuyahoga and State of Ohio, have invented a new and useful Improvement in Automatic Lock-Joints for Railway-Rails, of which the following is a full, clear, and exact description.

My invention relates to the devices employed in fastening together the ends of railway rails, and it consists in an improved locking device for holding the fish or angle plates firmly against the rails, whereby the vertical or lateral strains brought to bear upon the plates will by means of such device tend to wedge them more firmly in place, such tendency increasing proportionately with the increase of pressure; consequently the device automatically compensates for any wearing of the parts and preserves a constant and intimate contact of the plates with the rails.

Heretofore, in rail-joints wherein ordinary fish or angle-plates were employed, the tendency of the pressure exerted upon the joint has always been to push them outward from their normal position and loosen the joint. This loosening of the joint and sliding of the plates upon the rails quickly wears away the bearing edges and as no positive automatic means for tightening the parts as they wear away has been provided heretofore, the joint soon becomes useless since it allows a wide vibration of the ends of the rails and in no way stiffens the joints so as to produce the effect of a continuous rail. In my construction, on the contrary, not only does the pressure tend to hold the bearing edges of the plates in firm contact with the head and foot of the rail and thereby prevent any loosening of the parts, but any wearing of the edges consequent upon long continued use is automatically taken up and the plates pressed inwardly by means of my improved lock, the force necessary to effect this being derived from the very pressure which has heretofore thrust them outward in the opposite direction.

I have described in my former patent No. 395,918, granted on January 8, 1889, a fish-plate which itself acts as a locking key as in the present case, but the device therein disclosed necessitates a peculiar construction of the ends of the rails and of the fish-plates, whereas the present device can be applied to the ordinary plates and rails with little or no change thereof, thus greatly enhancing the practical value of the device on account of its easy application to existing conditions.

Figure 3:
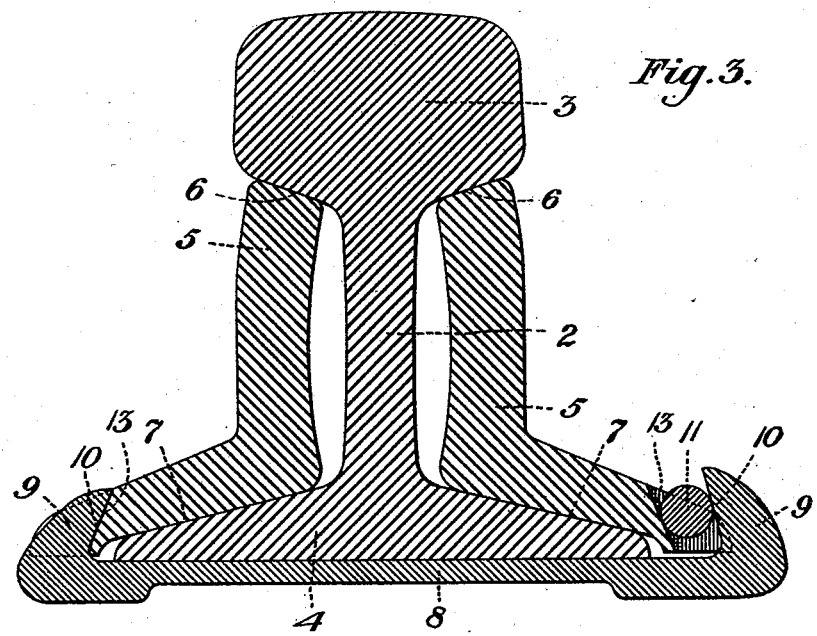
Figure 4:
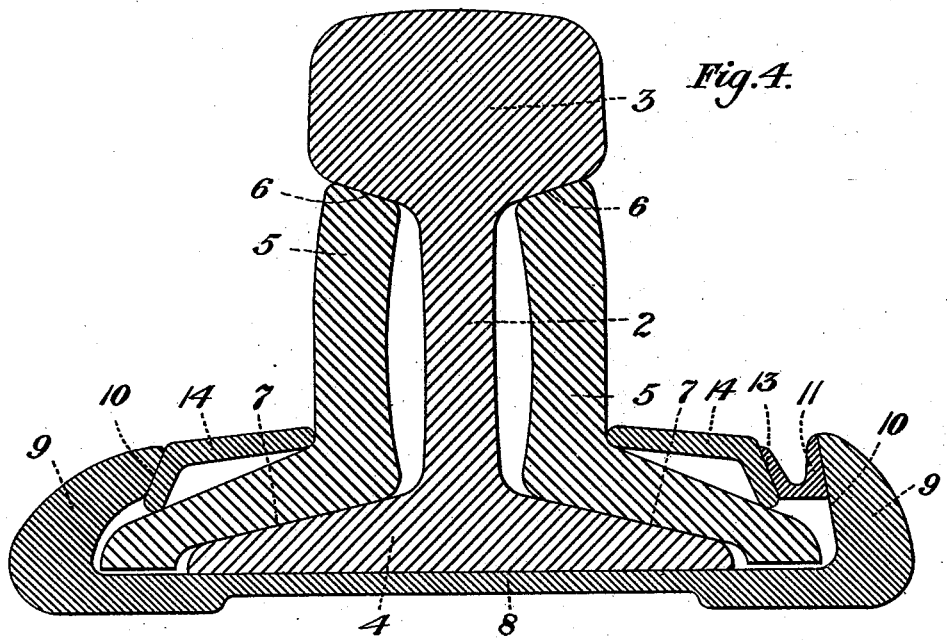
Figure 5:
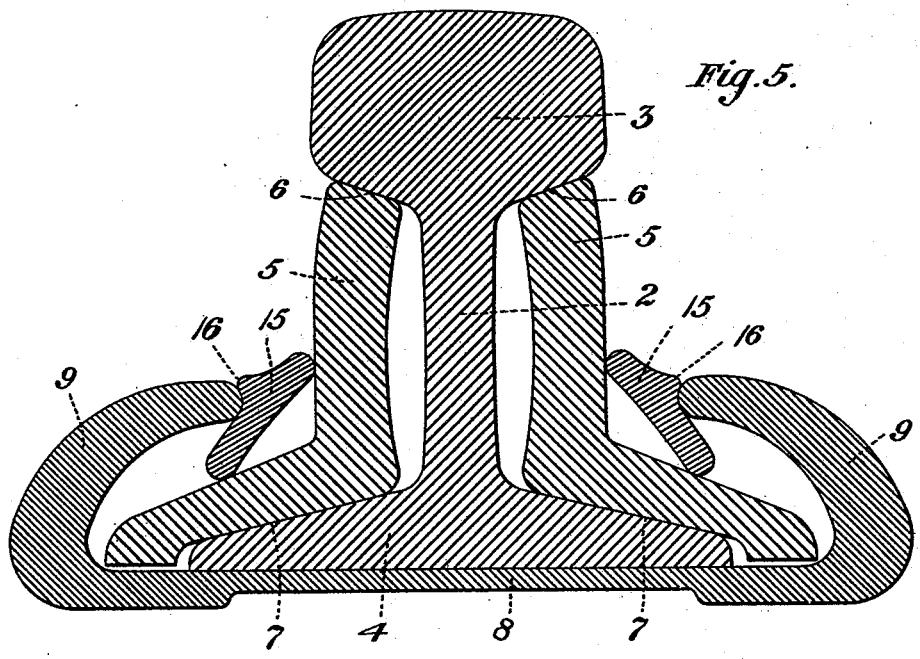
Figure 6:
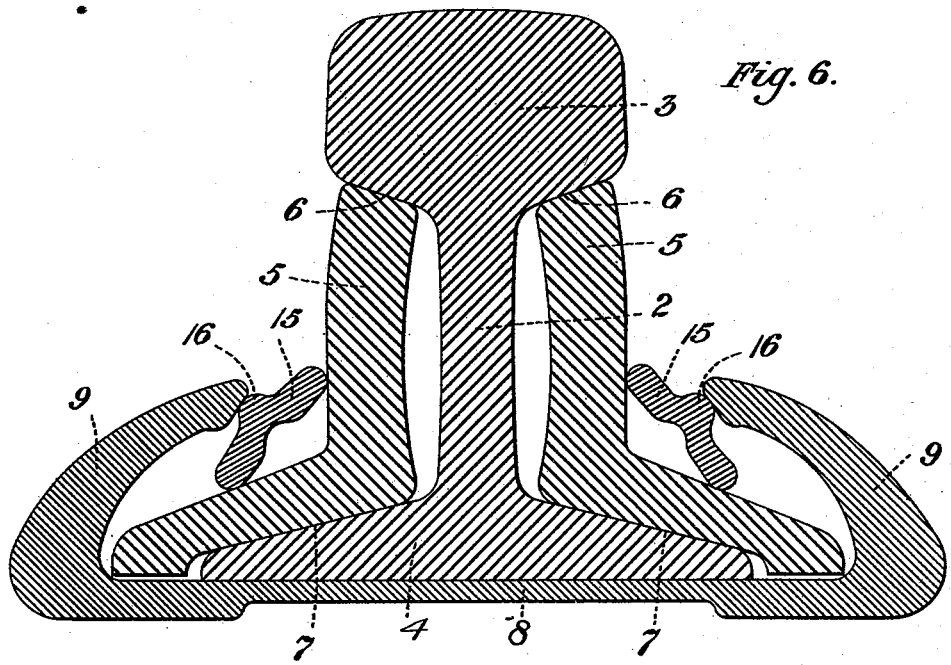

Referring to the accompanying drawings, forming part of this specification, Figure 1 is a cross-sectional view of a rail joint provided with the preferred form of my improved locking means; and Fig. 1' is a side elevation of the same. Figs. 2, 3 and 4 are views similar to Fig. 1. Figs. 5 and 6 are corresponding views of a second form of my invention; and Figs. 7, 8, 9, 10 and 11 are views of a third form wherein the connecting bar passes through the plates, this form being illustrated with several minor variations.

Like symbols of reference indicate like parts in each of the views.

In all the forms the same broad principle of using a self-locking key is employed, and as I consider myself to be the first to use with the ordinary plates a key which utilizes the heretofore deleterious pressure to effect the forcing of the plates more firmly to place and to automatically take up wear of the same, I desire to claim this device broadly. By the term "self tightening or locking key" in the claims, then, I mean a key which is inserted from above between the connecting bar or plate and the fish or angle-plate, and which is of such construction that the force exerted upon it by any pressure upon the rail tends to lock it more firmly in place and automatically compensates for any wearing of the parts.

Thus in each view, 2 represents the web, 3 the head, and 4 the foot of the rail.

5, 5, are the ordinary fish or angle plates, having the surfaces 6 and 7 bearing respectively upon the head and foot of the rail.

In the form of Figs. 1–6 inclusive, a chair or connecting plate 8 is provided upon which the ends of the rail rest, this plate having the inwardly-bent flanges 9 turned up on each side of the rails. In Figs. 1–4 inclusive, the inner surfaces 10 of these flanges extend at an acute angle to the plane of the chair proper and against these surfaces bear the corresponding faces of the self-locking keys 11. In Figs. 1–3, the angle-plate 5 is provided with an angled surface 13, which extends at an obtuse angle to the plane of the seat, and between this surface and the opposing face of the flange 10 is seated the key 11. The angled surfaces 10 and 13 must have a certain relation to each other so that the space narrows downwardly. In Figs. 1 and 2 the key 11 is in the form of a self-tightening wedge having bearing faces extending at different angles to the plane of the base and corresponding to the angles of the faces 10 and 13, while in Fig. 3 it takes the form of a simple cylindrical roll. When this key is seated in place and a pressure is brought upon the head of the rail, the angle plate tends to slide outwardly on the sloping foot of the rail. This force, instead of tending to eject the key 11 from its place, as would result if its two bearing surfaces were at the same angle to the plane of the seat, or if the inner face of the flange 9 were inclined outwardly, tends to force the key down farther into its seat.

The upper edge of the angle plate cannot swing outwardly since this would tend to rotate the plate upon the outer edge of the rail foot as an axis; but the circle drawn from this edge as a center passes through the head of the rail, and hence downward pressure cannot force out the upper bearing edge of the plate. The upper edge of the key also prevents this pivoting of the angle plate by reason of its downward and inward pressure. The outward pressure exerted against the key tends to slide it down the inclined face 10, but this is prevented by the converging of the planes of the faces 10 and 13, thus narrowing the space toward the bottom. The angles of the face are such that any pressure upon the key through the flange 9 also presses the chair or connecting piece up against the rail. Any pressure exerted through the chair 8 will likewise, by means of the flange 9, tend to draw down the key and this is prevented, except in case of wear as above described, so that when the key is seated in place and pressure is brought upon the rail, a force is exerted upon the key which tends to bind the parts together and the greater the pressure the greater is this tendency.

It is evident that the key may be used upon both sides of the rail as in Fig. 1, or upon one side only as in Fig. 2, and also that the roll of Fig. 3 will be forced downwardly and held in place in like manner as the wedge and serve as a self-locking key. In Fig. 4 I show a similar arrangement which may be used without cutting or recessing the angle plates, a rolled angle bar 14 being inserted between the key and the outer face of the angle plate. The face 13 of this angle iron has the obtuse angle similar to the face of the recess in Figs. 1, 2 and 3, and the pressure exerted through this iron evidently produces the same effect as in the forms shown in Figs. 1, 2 and 3. It is evident that the wedge may be used upon both sides of the rail or upon one side only as shown, the other flange of the plate bearing directly against the angle iron as at the left hand of Figs. 2 and 3.

In Figs. 5 and 6 I show two very similar forms, wherein the self-locking key consists of a bar 15 having its edges bearing upon the vertical and the outwardly sloping faces of the angle-iron respectively, while a ridge or protuberance 16 is provided against which the flange 9 of the plate bears. In this form any outwardly-sliding of the angle plate tends to rotate the bar 15 upon the end of the flange 9 as an axis. But this would push in the angle-plate and increase the pressure of the plate against the foot of the rail. This forcing in of the plate is impossible except as the parts wear, because of the converging angles of the head and foot of the rail. The same action is therefore produced as results from the forms of key shown in the former figures.

In Figs. 7-11 inclusive, I illustrate a form of my invention which is more especially adapted for use with fish-plates, but which may also be used with angle-plates. In these cases the connecting bar takes the form of a single or double headed bolt passing through holes in the fish-plates and having the self-locking keys inserted between the head of the double headed bolt, or the nut on the single headed bolt, and the opposing face of the fish-plate.

Figure 7:
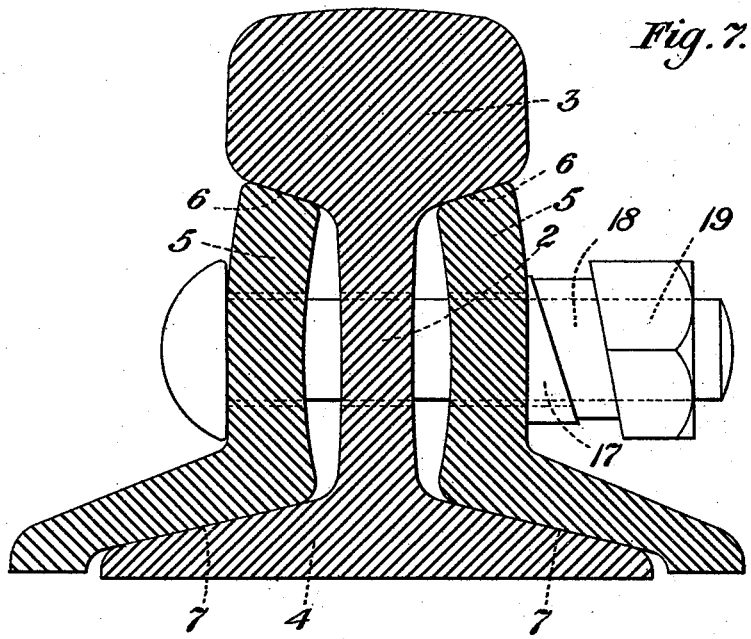

In Fig. 7, a slotted or apertured piece 17 having an inner flat face bearing upon the fish-plate and an outer face running at an obtuse angle to the plane of the lower edge of the connecting bolt is employed. The acute angle for the other side of the key 18 is formed upon the nut 19, and when the parts are in place the pressure upon the fish-plates exerts a horizontal force outwardly through the part 17, and on account of the converging and varying angles upon the inner face of the nut and the outer face of the piece 17, this force tends to slide the locking-key 18 downwardly upon the acute angled face of the nut 19; but as the faces of the nut 19 and piece 17 converge, this force is counteracted and the wedge fixed more firmly in place as in the former cases.

Figure 8:
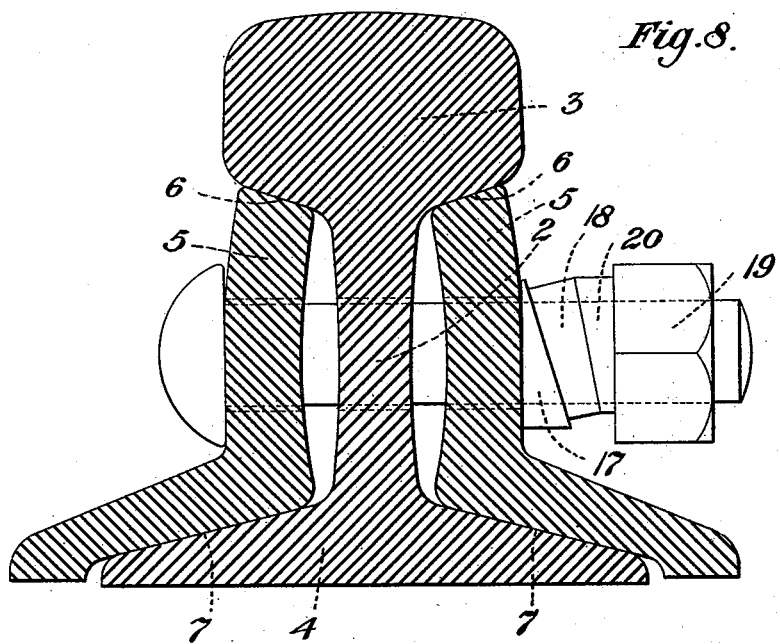

In Fig. 8 the acute angle is produced by a piece 20 fitting against the nut and having the suitable acute angle upon its inner face. By this means the ordinary fish-plate and bolt may be employed, it being only necessary to insert the two beveled faced pieces 17 and 20 and the self-locking key 18.

Figure 9:
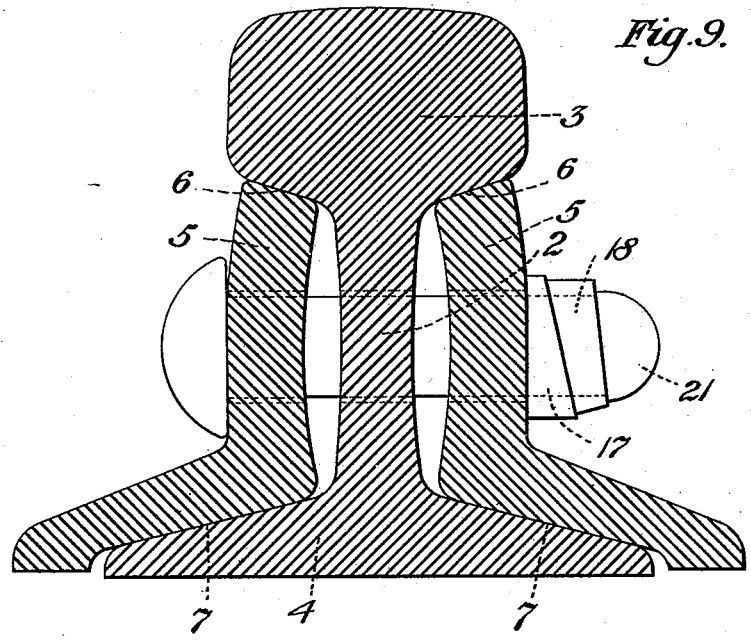
Figure 10:
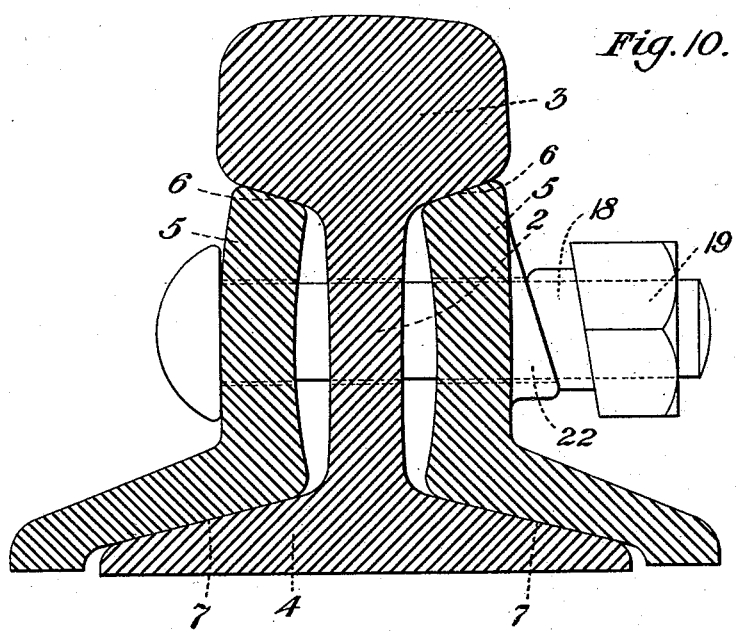
Figure 11:
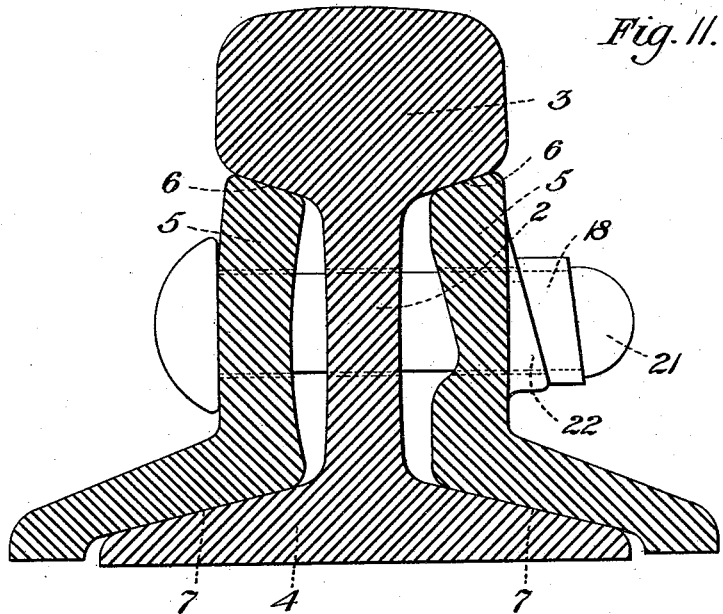

In Fig. 9 I show a form similar to that of Fig. 7, but with a double-headed bolt in place of the ordinary bolt and nut, the head 21 of the bolt being suitably beveled at an acute angle to the plane of the bolt. The inner obtuse angle may be obtained by a suitable shoulder 22 upon the fish-plate or angle-plate as in Figs. 10 and 11, in the one case the angle nut being used, and in the other the double-headed bolt with the angled head, thus obtaining the two converging and varying angles as before for the seating faces of the locking-key.

In all these cases, as above described, the pressure exerted upon the rails is so directed and utilized, by means of a self-locking key and its working parts as to tend toward the fixing of the key more firmly in place and the consequent firmer contact of the plates with the rails.

The advantages of my invention are obvious. The parts are simple, few in number, and in several forms may be applied to rails and fish-plates or angle-plates now commonly employed, without any changing of the same.

When the device is applied, every passing train tends to hold the parts more firmly in place and automatically compensates for any wearing of the bearing edges by the inward pressure upon the plates. Many changes in the form and arrangement of the parts may be made without departure from my invention, since

What I claim is—

1. In an automatic rail-joint, a connecting piece having heads or projections upon the outer sides of the fish or angle plates and a self-locking key located between the projection and the plate, and having bearings along its edges converging downwardly and outwardly; substantially as and for the purposes described.

2. In an automatic rail-joint, a connecting piece extending beneath the rail and having projections upon the outer sides of the fish or angle plates, and a self tightening key arranged to be inserted from above between the projection and the plate; substantially as and for the purposes described.

3. In an automatic rail-joint, a connecting piece extending beneath the rail and having projections upon the outer sides of the fish or angle plates, and a self-tightening key arranged to be inserted from above between the projection and fish or angle plate, the inner surface of the projection being at an acute angle to the plane of the chair, and a face upon the fish or angle plates extending at an obtuse angle to the plane of the chair; substantially as and for the purposes described.

4. In an automatic rail-joint, a connecting piece extending beneath the rail and having projections, provided with an inner face extending at an acute angle to the connecting piece, upon the outer sides of the fish or angle plates, a bearing face upon the plate at an obtuse angle to the plane of the connecting piece, and a key seated between said faces; substantially as and for the purposes described.

5. In an automatic rail-joint, the combination with the angle plates having bearings upon the head and foot of the rails, of a connecting piece having heads or projections upon the outer sides of the plates, a locking recess between the projection and angle plate whose sides converge downwardly and outwardly at differing angles, and a self-locking key in said recess; substantially as and for the purposes described.

In testimony whereof I have hereunto set my hand this 15th day of December, A. D. 1891.

JOHN LANG POPE.

Witnesses:
W. B. WHITING,
LON. M. SNYDER.